US005471324A

United States Patent [19]
Rolleston

[11] Patent Number: 5,471,324
[45] Date of Patent: Nov. 28, 1995

[54] COLOR PRINTER CALIBRATION WITH IMPROVED COLOR MAPPING LINEARITY

[75] Inventor: Robert J. Rolleston, Penfield, N.Y.

[73] Assignee: Xerox Corporation, Stamfor, Conn.

[21] Appl. No.: 223,194

[22] Filed: Apr. 5, 1994

[51] Int. Cl.$^6$ .................................. H04N 1/46; G03F 3/08
[52] U.S. Cl. ......................... 358/518; 358/519; 358/523; 358/525
[58] Field of Search ...................... 358/504, 518, 358/519, 520, 521, 523, 525, 524; 395/109, 131; 345/199; 348/191; 395/131

[56] References Cited

U.S. PATENT DOCUMENTS

| | | | |
|---|---|---|---|
| 2,790,844 | 4/1957 | Neugebauer | 358/518 |
| 4,275,413 | 6/1981 | Sakamoto et al. | 358/525 |
| 4,500,919 | 2/1985 | Schreiber | 358/518 |
| 4,901,258 | 2/1990 | Akiyama | 358/525 |
| 4,941,039 | 7/1990 | E'Errico | 358/518 |
| 4,992,861 | 2/1991 | D'Errico | 358/518 |
| 5,053,866 | 10/1991 | Johnson | 358/518 |
| 5,305,119 | 4/1994 | Rolleston et al. | 358/523 |
| 5,311,332 | 5/1994 | Imao et al. | 358/518 |
| 5,321,797 | 6/1994 | Morton | 395/131 |

OTHER PUBLICATIONS

Po—Chieh Hung, "Tetrahedral Division Technique Applied to Colorimetric Calibration for Imaging Media", Annual Meeting IS&T, N.J. May, 1992, pp. 419–422.

Po—Chieh Hung, "Colorimetric Calibration for Scanners and Media", SPIE, vol. 1448, Camera and Input Scanner System (1991).

Sigfredo I. Nin et al, "Printing CIELAB Images on a CMYK Printer Using Tri–Linear Interpolation", SPIE Proceedings, vol. 1670, 1992, pp. 316–324.

William J. Gordon et al, "Shepard's Method of 'Metric Interpolation'to Bivariate and Multivariate Interpolation", Mathematics of Computation, vol. 32, No. 141, Jan. 1978, pp. 253–264.

P. Lancaster et al, "Surfaces Generated by Moving Least Squares Methods"; Mathematics of Computation, vol. 32, No. 155, Jul. 1981, pp. 141–158.

P. Laihanen, "Colour Reproduction Theory Based on the Principles of Colour Science"; Adavnces in Printing Science & Technology, W. H. Banks ed, Pentech Press, London 1988, pp. 1–36.

P. Laihanen, "Optimization of Digital Color Reproduction on the Basis of Visual Assessment of Reproduced Images", Proceedings of the SID, vol. 30, No. 3, 1989, pp. 183–190.

D. Shepard, "A Two–Dimensional Interpolation Function for Irregularly–Spaced Data", Proceedings—1968 ACM National Conference, pp. 517–524.

*Primary Examiner*—Scott A. Rogers

[57] ABSTRACT

In a color printer calibration process, a color printer is driven with a set of printer signals selected to print a set of color samples throughout a printer gamut. A color measuring device measures the colorimetric response at each sample, to derive a mapping of printer signals to colorimetric responses of the printer. From the colorimetric responses, a preprocessing step is used to increase the number of measurements, using linear interpolation between local responses whereby the number of colorimetric responses to be mapped is increased. Then, a lookup table mapping colorimetric values to printer signals is generated, at regular intervals throughout the printer gamut, to produce a regular interval set of interpolated colorimetric values, derived from the measured colorimetric values and the linearly interpolated values using a distance-weighted averaging method. The look up table is stored in a color conversion memory for use in converting color definitions from a first color space to the printer color space.

13 Claims, 6 Drawing Sheets

COLOR PRINTER CALIBRATION WITH IMPROVED COLOR MAPPING LINEARITY

FIELD OF THE INVENTION

The present invention is directed towards compiling lookup tables representative of printer characteristics, to enable the conversion of colors defined in a first color space to colors defined in the printer color space, and more particularly to a method of making such table more linear.

CROSS REFERENCE

Cross reference is made to the following co-pending applications: U.S. Ser. No. 07/955,075, filed Oct. 1, 1992, entitled "Color Printer Calibration Architecture", by R. J. Rolleston et al. (assigned to the same assignee as the present application); U.S. Ser. No. 08/131,168, filed Oct. 4, 1993, entitled "Reduced Storage of Pre-Computed Difference Tables Used In Color Space Conversion", by R. J. Rolleston (assigned to the same assignee as the present application); U.S. Ser. No. 08/144,987, filed Oct. 29, 1993, entitled "Color Printer Calibration Test Pattern" by R. J. Rolleston et al. (assigned to the same assignee as the present application); and U.S. Ser. No. 08/179,284, filed Jan. 10, 1994, entitled "Color Printer Calibration Architecture", by R. J. Rolleston et al. (assigned to the same assignee as the present application).

INCORPORATION BY REFERENCE

The following patents are specifically incorporated by reference: U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system. The following articles are also hereby incorporated by reference: Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991); Sigfredo I. Nin, et al., "Printing CIELAB Images on a CMYK Printer Using Tri-Linear Interpolation", SPIE Proceedings, Vol. 1670, 1992, pp. 316–324; William J. Gordon et al., "Shepard's Method of 'Metric Interpolation' to Bivariate and Multivariate Interpolation", Mathematics of Computation, Vol. 32, No. 141, January 1978, pp. 253–264; P. Lancaster et al., "Surfaces Generated by Moving Least Squares Methods", Mathematics of Computation, Vol. 32, No. 155, July 1981, pp. 141–158; Pekka Laihanen, "Colour Reproduction Theory Based on the Principles of Colour Science", Advances in Printing Science and Technology, W. H. Banks ed., Pentech Press, London, 1988, pp. 1–36; Pekka Laihanen, "Optimization of Digital Color Reproduction on the Basis of Visual Assessment of Reproduced Images", Proceedings of the SID, Vol 30. No. 3, 1989, pp. 183–190; and Donald Shepard, "A two-dimensional interpolation function for irregularly-spaced data," Proceedings-1968 ACM National Conference, pp. 517–524.

BACKGROUND OF THE INVENTION

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Scanner output is commonly transformed to a color space of tristimulus values, i.e., RGB (red-green-blue). Commonly, these values are a linear transformation of the standard XYZ coordinates of CIE color space, or a corrected transform of those values. In the case of computer generated images, colors defined by the user at the user interface of a workstation can be defined initially in color space of tristimulus values. These colors are defined independently of any particular device, and accordingly reference is made to the information as being "device independent".

Printers have an output which can be defined as existing in a color space called CMYK (cyan-magenta-yellow-key or black) which is uniquely defined for the printer by its capabilities and colorants. Printers operate by the addition of multiple layers of ink or colorant in layers to a page. The response of the printer tends to be relatively non-linear. These colors are defined for a particular device, and accordingly reference is made to the information as being "device dependent". Thus, while a printer receives information in a device independent color space, it must convert that information to print in a device dependent color space, which reflects the gamut or possible range of colors of the printer.

The desirability of operating in a device independent color space with subsequent conversion to a device dependent color space is well known, as shown by U.S. Pat. No. 4,500,919 to Schreiber and U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of input values reflecting color samples throughout the printer gamut, the color samples are printed in normal operation of the printer. As previously noted, most printers have non-linear response characteristics.

In U.S. Pat. No. 4,275,413 to Sakamoto, the information derived is placed into lookup tables, stored in a memory, perhaps ROM memory or RAM memory where the lookup table relates input color space to output color space. The lookup table is commonly a three dimensional table since color is defined with three variables. In RGB space, at a scanner or computer, space can be defined as three dimensional with black at the origin of a three dimensional coordinate system 0, 0, 0, and white at the maximum of a three dimensional coordinate system which an 8-bit system, would be located at 255, 255, 255. Each of the three axes radiating from the origin point therefore respectively define red, green, and blue. A similar construct can be made for the printer, with axes representing cyan, magenta, and yellow. In the 8-bit system suggested, there will be, however, over 16 million possible colors ($256^3$). There are clearly too many values for a 1:1 mapping of RGB to CMY. Accordingly, as proposed in U.S. Pat. No. 4,275,413 to Sakamoto, only a relatively small number of samples are used to do the mapping from RGB to CMY, perhaps on the order of 1,000. Therefore, the lookup tables consist of a set of values which could be said to be the intersections for corners of a set of cubes mounted on top of one another. Colors falling within each cubic volume can be interpolated from the measured values, through many methods including tri-linear interpolation, tetrahedral interpolation, polynomial interpolation, linear interpolation, and any other interpolation method depending on the desired speed and accuracy of the result.

It would be very easy to index device dependent color values or specifications to device independent color specifications, but that is not the requirement. Instead, device independent specifications must be mapped to device dependent specifications. Several problems arise. Of course, the primary problem is that the printer response is not a linear response. A second problem is that the color space, and therefore the coordinates defined in the color space must be maintained as a uniform grid, for maximum efficiency of some interpolation methods, particularly for tetrahedral interpolation, a very desirable method of interpolation.

Accordingly a three dimensional lookup table (LUT) may be constructed which puts device independent input values into a predictable grid pattern. One method of accomplishing this requirement is by an interpolation process which derives a value at a desired location as a function of all (or a significant set) of measured color values weighted in accordance with the formula:

$$C = \frac{\sum_{i,j,k} \frac{1}{d^4} \times P_{i,j,k}}{\sum_{i,j,k} \frac{1}{d^4}}$$

Where C is the color value at a given point in color space,
i, j, k is each measured point in color space
$d_{i,j,k}$ is the distance from a given point to each i, j, k
$P_{i,j,k}$ is a color value at i, j, k.

This method of interpolation is known as Shepard's Method (See, for example "Shepard's Method of 'Metric Interpolation' to Bivariate and Multivariate Interpolation" by W. Gordon and J. Wixom, Mathematics of Computation, Vol. 32, No. 141, January 1978, pp. 253–264 and papers by Laihanen which teach the use of 1/d*'4 for color correction. Shepard's Method suggests that the difference between an asked-for color which was directed to a printer and the printed color can be thought of as a vector which maps a device independent color to a device dependent color. Then, for any other device independent point in color space which is desired, that point can be thought of as a vector quantity, derived by averaging over the space all the known vectors, each vector weighted by a function which decreases its effect on the desired color vector as that vector is further and further away from the color correction vector being calculated. In one useful formula, each vector is weighted by a function of $(1/d^4)$. Other weighting functions are also possible, and the weighting function can vary throughout the color space.

However, a problem referred to as "scalloping" occurs at the interpolated values. With reference to FIG. 1, a simplified example is given, where, given vectors A, B, C, D, E, known by measurement, a new interpolated vector F located between A and B is obtained by averaging all the vectors, weighted by the Shepard's Method. The result is that, the interpolated vector differs from what would likely be a more probable value based on vectors A and B, due to the contributions of vectors C, D, E, even though they are some distance away. This problem is also pointed out by P. Lancaster et al., "Surfaces Generated by Moving Least Squares Methods", Mathematics of Computation, Vol. 32, No. 155, July 1981, pp. 141–158 page 148–149, where the problem is referred to as "dimpling".

The references cited herein are incorporated by reference for their teachings.

SUMMARY OF THE INVENTION

In accordance with the invention there is provided a method of linearizing interpolated values in a color space transform look up table derived from printer calibration measurements, to derive an improved color space transformation.

In accordance with one aspect of the invention, in a color printer calibration process, a color printer is driven with a set of printer signals selected to print a set of color samples throughout a printer gamut. A color measuring device measures the colorimetric response at each sample, to derive a mapping of printer signals to colorimetric responses of the printer. From the colorimetric responses, a preprocessing step is used to increase the number of measurements, using linear interpolation between local responses whereby the number of colorimetric responses to be mapped is increased. Then, a lookup table mapping colorimetric values to printer signals is generated, at regular intervals throughout the printer gamut, to produce a regular interval set of interpolated colorimetric values, derived from the measured colorimetric values and the linearly interpolated values using a distance-weighted averaging method. The look up table is stored in a color conversion memory for use in converting color definitions from a first color space to the printer color space.

The described method allows a decrease in the scalloping effect by creating a new data value within the colorimetric value interval. The interpolation process will use both the original set of measured data and the expanded set of interpolated data. The new combined set will be more dense, and thus more localized, i.e., there is more likely to be an input data value near one of the regular interval interpolated values.

In accordance with another aspect of the invention, greater or lesser numbers of linear interpolated values may be generated through different regions of the gamut, reflecting the nature of accuracy in interpolation within the gamut region. Thus, for example, finer sampling (more linear interpolated values) may be desired in the darker colored regions, while courser sampling (fewer linearly interpolated values) may be desired in the lighter colored regions. In another example, finer sampling (more linear interpolated values) may be desired in the saturated color regions, while courser sampling (fewer linearly interpolated values) may be desired in the non-saturated color regions.

In accordance with yet another aspect of the invention, there is provided a method of calibrating a color printer, the color printer responsive to printer signals to deposit printer colorants on a medium in accordance with printer signals received, including the steps of: operating the color printer with printer signals selected to cause the printer to print color samples on the medium; measuring a colorimetric response at each color sample printed on the medium, and producing a colorimetric signal indicative thereof, mapped to a corresponding printer signal, said colorimetric signals dispersed through a gamut of the printer at irregular intervals; preprocessing the colorimetric signals to increase the number thereof with interpolated signals, generating each interpolated signal as an interpolated function of a plurality of spatially proximate colorimetric signals; mapping the increased number of colorimetric signals to printer signals, to produce a regular interval dispersal of calculated colorimetric signals through color space, each of the calculated colorimetric signals mapped to a corresponding printer signal and derived from the colorimetric signals and the interpolated signals; storing the mapping in a color conversion memory for use in converting color definitions from a first color space to the printer signals suitable for producing a corresponding response at the color printer.

These and other aspects of the invention will become apparent from the following descriptions to illustrate a preferred embodiment of the invention read in conjunction with the accompanying drawings in which:

FIG. 1 is a one-dimensional example of the problem of scalloping addressed by the present invention;

FIGS. 2 and 3 together illustrate an overall system block diagram showing a color printing system in which the present invention might find use;

Figure 1:
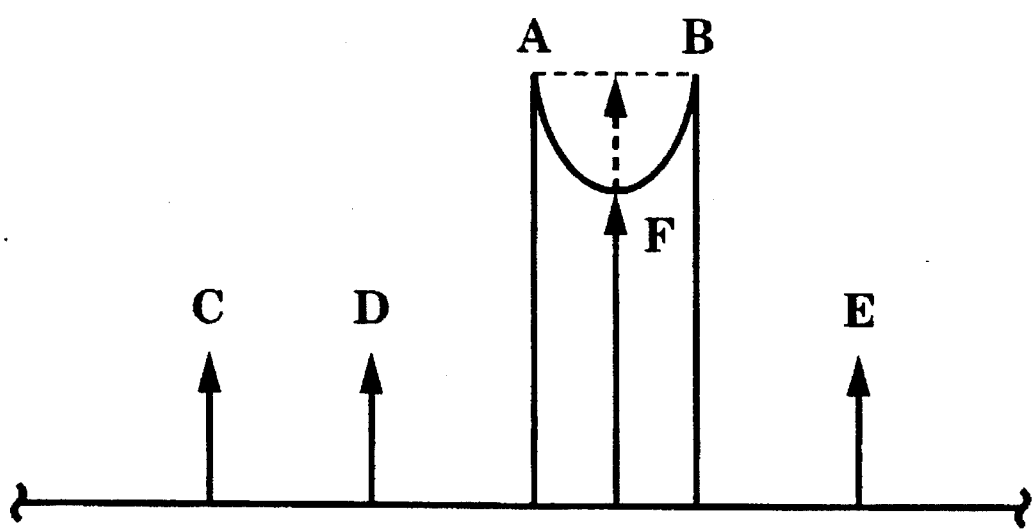
Figure 2:
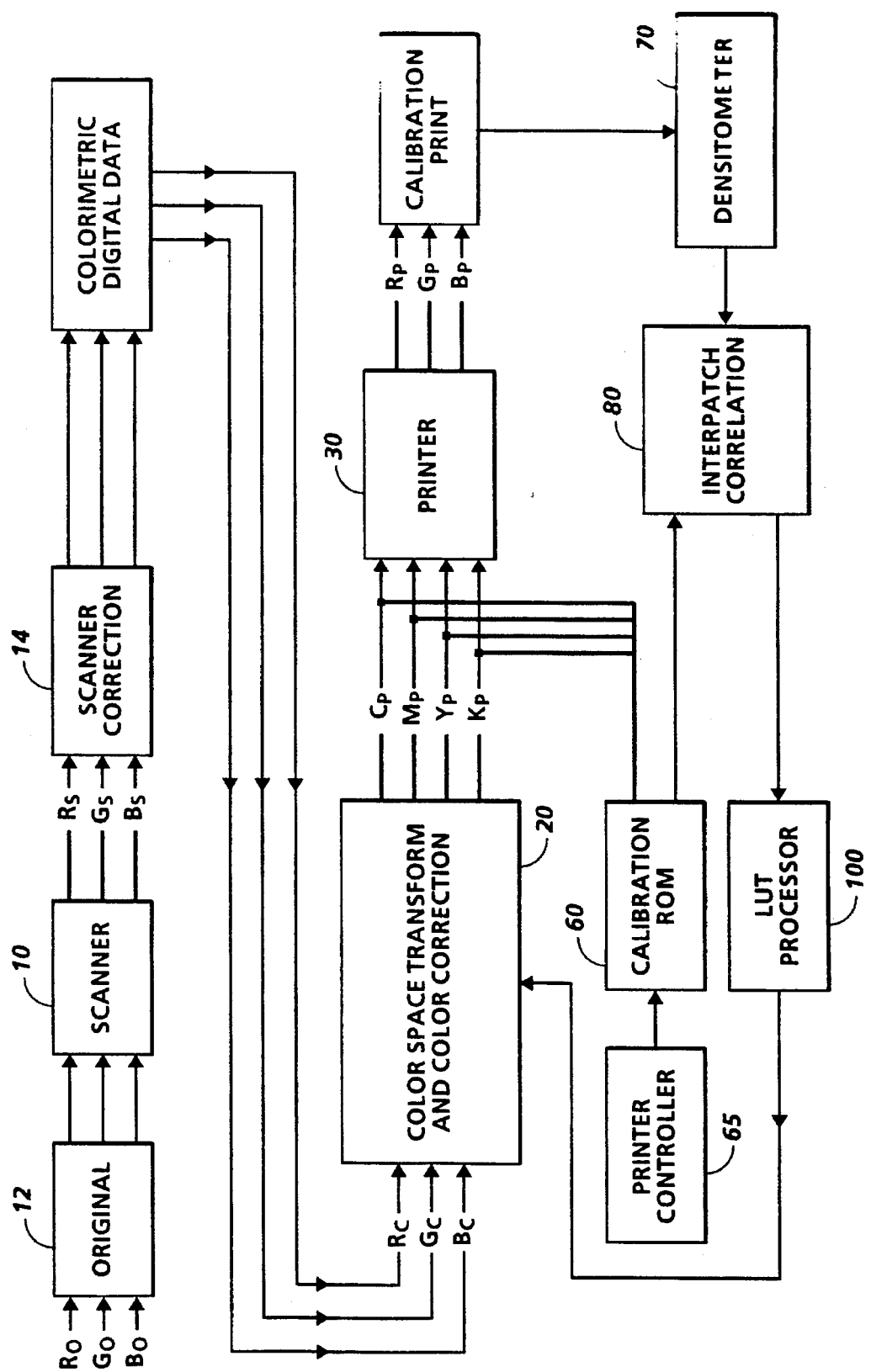

Referring now to the drawings where the showings are for the purpose of describing an embodiment of the invention and not for limiting same, a basic system for carrying out the present invention is shown in FIG. 2. In a system, a scanner 10, such as perhaps the color scanner available in the Xerox 5775 digital color copiers, which can be calibrated to produce a set of digital colorimetric or device independent data describing a scanned image 12, which, by definition can be defined in terms of the colorimetric $R_o$, $G_o$, $B_o$ space. Resulting from the scanning operation is a set of scanner image signals $R_s$, $G_s$, $B_s$, defined in device dependent scanner terms. Incorporated into the scanner or another processing path is a post-scanning processor 14, which provides correction of scanner image signals $R_s$, $G_s$, $B_s$ to colorimetric terms, $R_c$, $G_c$, $B_c$, typically digital in nature. The values may be in terms of CIE color space (r,g,b), or the L*a*b* luminance-chrominance space ($LC_1C_2$). A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant driving signal $C_p$, $M_p$, $Y_p$, $K_p$ that will be used to drive a printer 30. In one possible example, the colorant values represent the relative amounts of cyan, magenta, yellow, and black toners that are to be deposited over a given area in an electrophotographic printer, such as, again, Xerox 5775 digital color copiers. The printed output image may be said to be defined in terms of $R_p$, $G_p$, $B_p$, which are hoped to have a relationship with $R_o$, $G_o$, $B_o$ such that the printed output image has a color that is colorimetrically similar to the original image, although that similarity is ultimately dependent upon the gamut of the printing device. As described in U.S. patent application Ser. No. 07/955,075 by Rolleston, entitled "Color Printer Calibration Architecture", black addition for under color removal and gray balance processing may also be combined into the color space transform element. Although these features are not required, they are desirable and are illustrated herein. When we refer to colorimetric spaces, we are referring to spaces which are transforms of CIE XYZ space (1931). When we refer to device dependent space, we refer to a color space which is defined only in terms of operation of the device using it. While many color spaces have three dimensions, it is possible to have color spaces with less than three dimensions or more than three dimensions.

Figure 3:
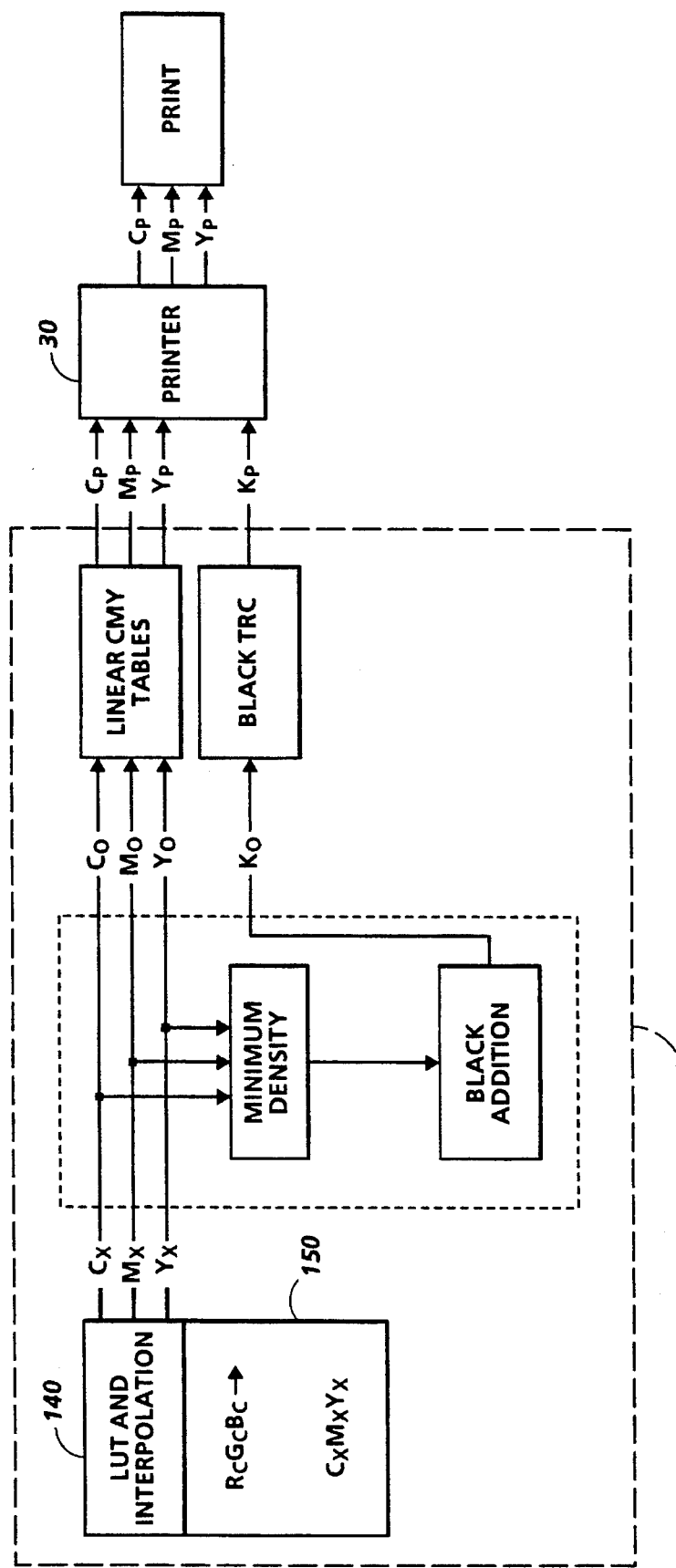

With reference now to FIG. 3, and color space transformation and color correction 20, initially, $R_c$, $G_c$, $B_c$ color signals are directed to an interpolation device 140, which includes a three dimensional lookup table stored in a device memory 150 such as a RAM or other addressable memory device, which will meet speed and memory requirements for a particular device. Color signals $R_c$, $G_c$, $B_c$ are processed to generate address entries to the table which stores a set of transform coefficients with which the $R_c$, $G_c$, $B_c$ may be processed to convert them to $C_x$, $M_x$, $Y_x$ colorant signals or any multi-dimensional output color space including but not limited to CMYK or spectral data. Values which are not mapped may be determined through interpolation.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values.

To create the table, a set of color patches are created, preferably including determined linearization and black addition. This is done by printing and measuring about 1000 to 4000 patches of printer colors distributed throughout the color space, i.e., a large set of printer driving signals are generated, in varying densities of combinations of C,M,Y,K, and used to drive the printer. The color of each patch is measured, using a spectrophotometer to determine color in terms of $R_c$, $B_c$, $G_c$. The measured colors of these patches are used to build a three dimensional lookup table (LUT) relating $R_c$, $B_c$, $G_c$ defined colors to $C_xM_xY_x$ defined colors. Conversions that do not include mapped and measured points may be interpolated or extrapolated. Reference is made to U.S. patent application No. 08/144,987 to Rolleston entitled, "Color Printer Calibration Test Pattern", filed Oct. 29, 1993, which shows and describes a calibration test pattern for this purpose.

With reference again to FIG. 2, a calibration image is conveniently stored in a device memory such as calibration ROM 60, RAM, floppy or the like, or are generated on the fly with a predetermined generation function. Signals stored therein are directed to the printer under the control of printer controller 65. Densitometer or spectrophotometer 70 is used to scan the calibration target and produce $R_oG_oB_o$ signal values as a function of sensed density, representing the colors of each scanned patch. Interpatch correlation processor 80 reads the responses provided from densitometer 70 for each location in the calibration target and correlates the response with the input CMY signals, so that an $R_cG_cB_c$ to CMY mapping is generated.

Figure 4:
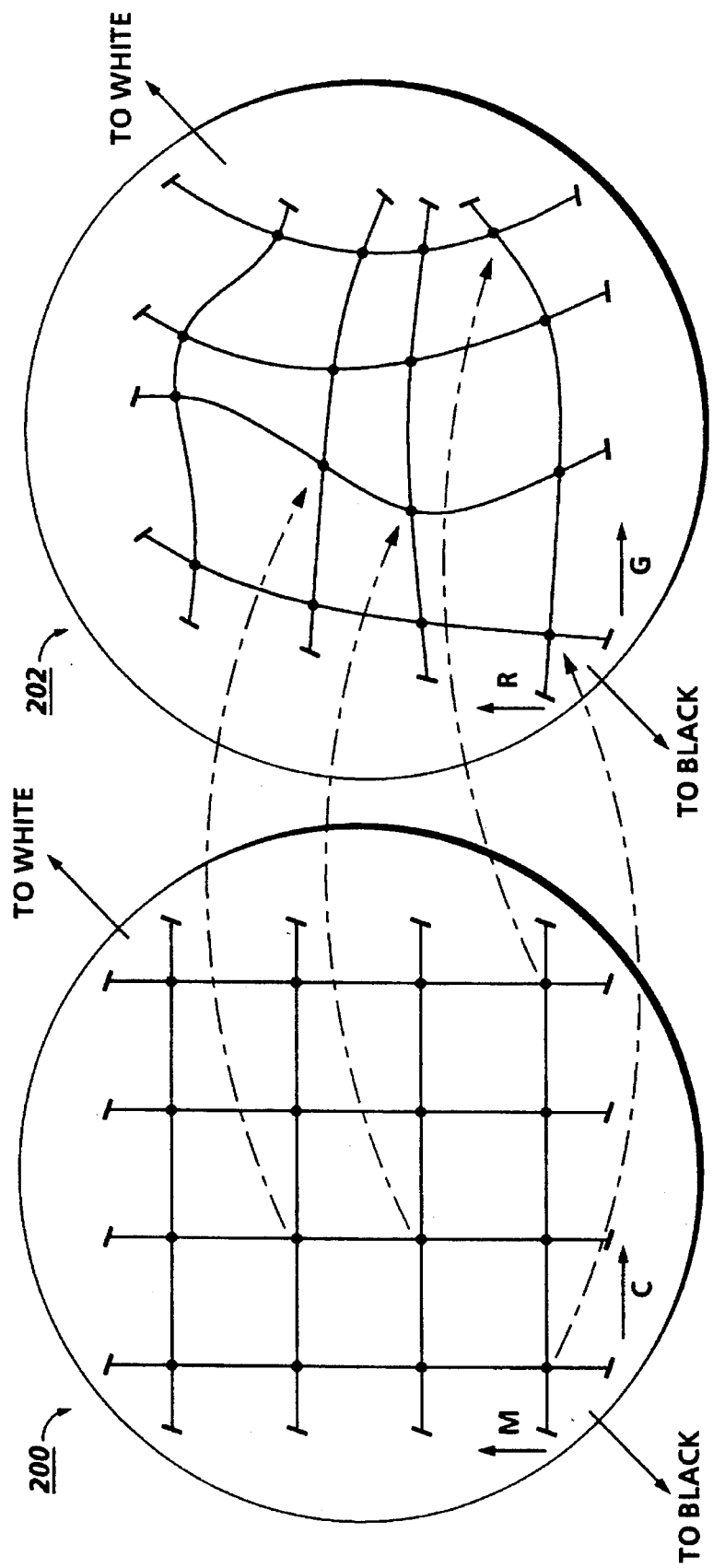
FIG. 4 illustrates the mapping of the regular interval device dependent values to irregular intervals of device independent or colorimetric values.

With reference to FIG. 4, the derived mapping is illustrated for a two dimensional example. Readily seen is that the regular interval, device dependent grid, reflecting printer signals used to drive the printer, maps on a one-to-one basis with measured colorimetric or device independent values reflecting the actual print obtained.

Figure 5:
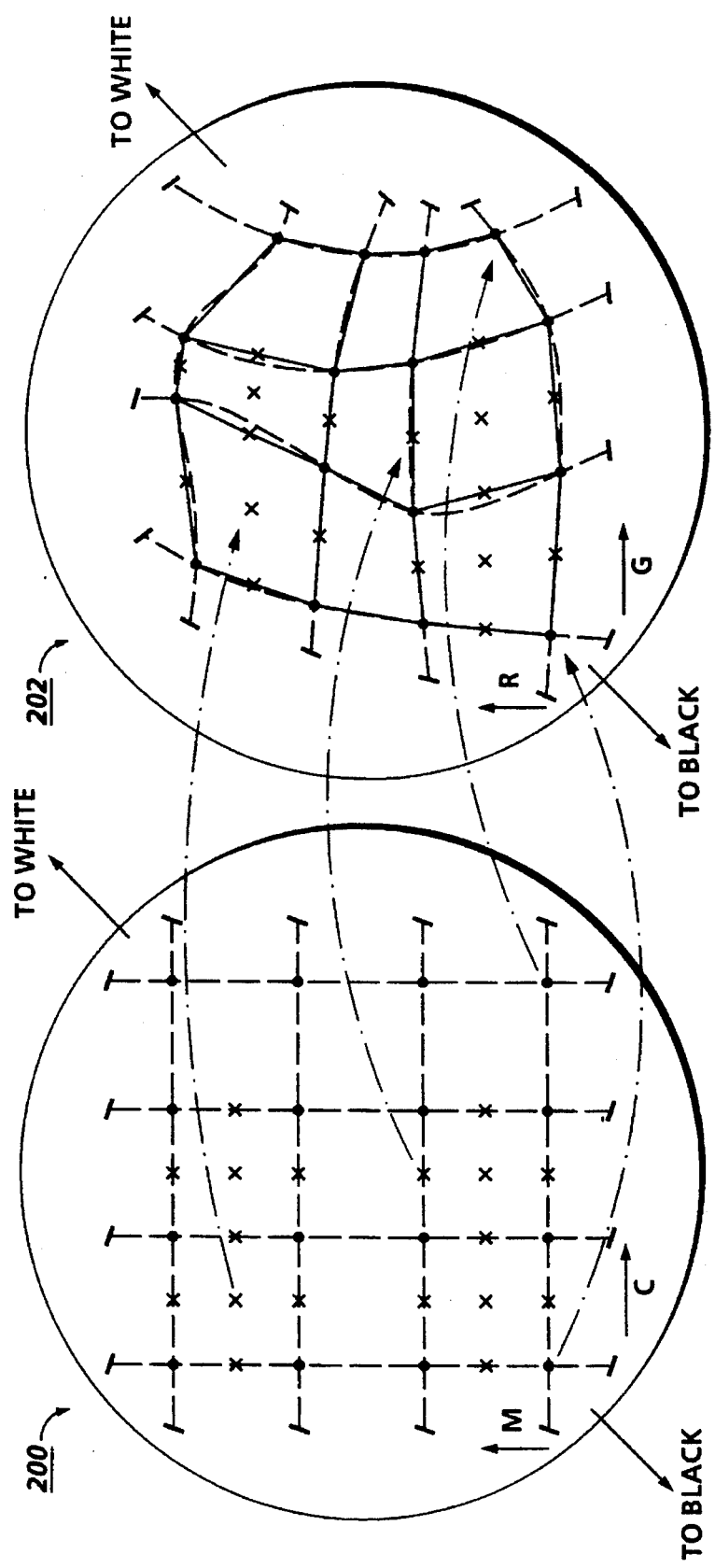
FIG. 5 shows the increasing of colorimetric samples by linear interpolation.

In accordance with the invention, and with reference to FIG. 2, LUT processor 100 receives data from interpatch correlation 80, and uses a linear interpolation function to generate additional data in the intervals between sampled data. LUT processor 100 may be responsive to operator or knowledge-based commands to generate more data in selected portions of the gamut. One possible interpolation method may be to average measured values. With reference now to FIG. 5, with the original grids now shown in phantom, we illustrate the addition of linearly interpolated points on each grid, to increase the number of samples between two points in the regular grid to derive a third color $P_{i,j,k}$ or:

$$P_{i,j,k} = \frac{(C_2 M_2 Y_2) + (C_1 M_1 Y_1)}{2}$$

Thus we can also say for device independent space that for the corresponding color Q:

$$Q_{i,j,k} = \frac{(R_2 B_2 G_2) + (R_1 B_1 G_1)}{2}$$

Where $C_N M_N Y_N$ is a printer signal triplet defining a point N in device dependent color space, and $R_N B_N G_N$ is a colorimetric triplet defining a corresponding point N in device independent color space.

This process is iterated until there is a satisfactory number of samples within the gamut or any selected portion thereof. It will be noted in FIG. 5 that the number of colors was not increased throughout the entire grid. It will no doubt be appreciated that while we have shown an example interpolated color as merely the average of the closest two colors, more complex functions might be used, and more colors may be used for the interpolation. It will additionally be appreciated that since the process is iterative, it may occur that one of the colors from which interpolation has been made, may be a previously derived interpolated point.

In accordance with another aspect of the invention, greater or lesser numbers of linear interpolated values may be generated through different regions of the gamut, reflecting the nature of accuracy in interpolation within the gamut region. Thus, for example, finer sampling (more linear interpolated values) may be desired in the darker colored regions, while courser sampling (fewer linearly interpolated values) may be desired in the lighter colored regions. In another example, finer sampling (more linear interpolated values) may be desired in the saturated color regions, while courser sampling (fewer linearly interpolated values) may be desired in the non-saturated color regions.

Figure 6:
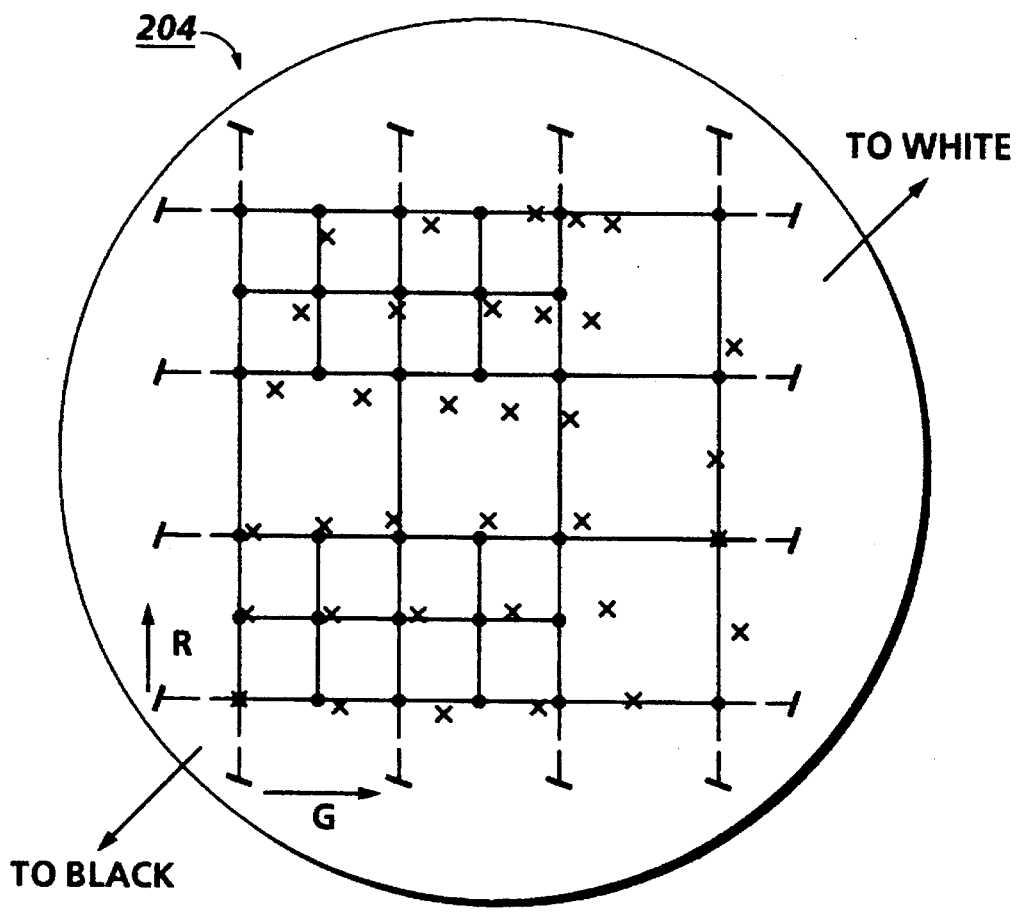
FIG. 6 illustrates a linear grid mapping to measured samples, illustrating that data will be derived for the grid intersection points.

With a larger set of samples now available, the device independent values may be mapped to the device dependent space. With reference to FIG. 6, a linear grid will be overlaid on the measured samples, illustrating that data will be derived at the grid intersection points. One method of accomplishing this requirement is by an interpolation process which derives a value at a desired location as a function of all (or a significant set) of measured color values weighted in accordance with the formula:

$$C = \frac{\sum_{i,j,k} \frac{1}{d^4} \times P_{i,j,k}}{\sum_{i,j,k} \frac{1}{d^4}}$$

Where C is the color value at a given point in color space, i, j, k is each measured point in color space $d_{i,j,k}$ is the distance from a given point to each i, j, k $P_{i,j,k}$ is a color value at i, j, k.

This method of interpolation is known as Shepard's Method (See, for example "Shepard's Method of 'Metric Interpolation' to Bivariate and Multivariate Interpolation" by W. Gordon and J. Wixom, Mathematics of Computation, Vol. 32, No. 141, January 1978, pp. 253–264 and papers by Laihanen which teach the use of 1/d*'4 for color correction). Shepard's Method suggests that the difference between an asked-for color which was directed to a printer and the printed color can be thought of as a vector which maps a device independent color to a device dependent color. Then, for any other device independent point in color space which is desired, that point can be thought of as a vector quantity, derived by averaging over the space all the known vectors, each vector weighted by a function which decreases its effect on the desired color vector as that vector is further and further away from the color correction vector being calculated. In one useful formula, each vector is weighted by a function of $(1/d^4)$. Other weighting functions are also possible, and the weighting function can vary throughout the color space. Another process useful in this step is inverse tetrahedral inversion transformation method described at Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991).

With the lookup table derived, it may be stored in LUT and interpolation 40, for use in converting device dependent values received from image creators to device independent printer signals.

It will no doubt be appreciated that while we have shown the use of the invention in the conversion of a device independent color space to a device dependent color space, the invention applies equally as well to conversions to any transformation from a first space to a second, device independent or device dependent.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method of calibrating a color printer, the color printer responsive to printer signals to deposit printer colorants on a medium in accordance with printer signals received, including the steps of:

operating the color printer with printer signals selected to cause the printer to print color samples on the medium;

measuring a colorimetric response at each color sample printed on the medium, and producing a colorimetric signal indicative thereof, mapped to a corresponding printer signal, said colorimetric signals dispersed through a gamut of the printer at irregular intervals;

preprocessing the colorimetric signals to increase the number thereof with interpolated signals, generating each interpolated signal as an interpolated function of a plurality of spatially proximate colorimetic signals;

mapping the increased number of colorimetric signals to printer signals, to produce a regular interval dispersal of calculated colorimetric signals through color space, each of the calculated colorimetric signals mapped to a corresponding printer signal and derived from the colorimetric signals and the interpolated signals;

storing the mapping in a color conversion memory for use in converting color definitions from a first color space to the printer signals suitable for producing a corresponding response at the color printer.

2. The method as defined in claim 1, wherein the preprocessing step interpolated function is a linear interpolation method.

3. The method as defined in claim 2, wherein the linear interpolation method averages a plurality of signals local to the location at which a signal is desired.

4. The method as defined in claim 1, wherein the method of mapping increased number of colorimetric signals to printer signals, produces colorimetic signals as a weighted function of printer signals.

5. The method as defined in claim 4, wherein the weighted function varies with the location of the printer signals in color space.

6. The method as defined in claim 1, wherein the method of mapping increased number of colorimetric signals to printer signals includes an inverse tetrahedral transformation.

7. A color printer including a calibration system, the color printer responsive to printer signals to deposit printer colorants on a medium in accordance with printer signals received, including the steps of:

means for operating the color printer with printer signals selected to cause the printer to print color samples on the medium;

means for measuring a colorimetric response at each color sample printed on the medium, and producing a colorimetric signal indicative thereof, mapped to a corresponding printer signal, said colorimetric signals are dispersed through a gamut of the printer at irregular intervals;

means for preprocessing the colorimetric signals to increase the number thereof with interpolated signals, using interpolation between spatially proximate responses;

means for mapping the increased number of colorimetric signals to printer signals, to produce a regular interval dispersal of calculated colorimetric signals through color space, each of the calculated colorimetric signals mapped to a corresponding printer signal and derived from the measured colorimetric values and the interpolated values;

means for storing the mapping in a color conversion memory for use in converting color definitions from a first color space to the printer signals suitable for producing a corresponding response at the color printer.

8. The device as defined in claim 7, wherein the preprocessing means interpolation is a linear interpolation function.

9. The device as defined in claim 8, wherein the linear interpolation function averages a plurality of signals local to the location at which a signal is desired.

10. The device as defined in claim 7, wherein the mapping means for mapping the increased number of colorimetric signals to printer signals, produces calculated colorimetric signals as a weighted function of printer signals.

11. The device as defined in claim 10, wherein the weighted function varies with the location of the printer signals in color space.

12. The device as defined in claim 7, wherein the mapping means for mapping increased number of colorimetric signals to printer signals includes an inverse tetrahedral transformation to calculated new colorimetic signals.

13. A color printer including a calibration system, the color printer responsive to printer signals to deposit printer colorants on a medium in accordance with printer signals received, including the steps of:

a printer controller, controlling printer operation;

a calibration memory, storing a set of printer signals suitable to drive the printer to print a test sheet;

a printer, responsive to control signals from the printer controller and the calibration memory to print the test sheet;

means for measuring the colorimetric response of the printer in printing the test sheet and producing as an output a set of measured colorimetric signals;

means for mapping measured colorimetric signals to printer signals that caused the printer to print the colorimetric signals;

a look up table processor, preprocessing the measured colorimetric signals to increase the number thereof with interpolated signals, using interpolation between spatially proximate responses;

a colorimetic signal interpolation processor producing a regular interval dispersal of calculated colorimetric signals through color space, each of the calculated colorimetric signals mapped to a corresponding printer signal and derived from the measured colorimetric values and the interpolated values;

a color space conversion memory, storing a lookup table, for use in converting colorimetric signals from a first color space to the printer signals suitable for producing a corresponding response at the printer.

* * * * *